United States Patent
Dice et al.

(10) Patent No.: US 8,725,974 B2
(45) Date of Patent: May 13, 2014

(54) PAGE-PROTECTION BASED MEMORY ACCESS BARRIER TRAPS

(75) Inventors: David Dice, Foxboro, MA (US); Antonios Printezis, Burlington, MA (US)

(73) Assignee: Oracle America, Inc., Redwood City, CA (US)

( * ) Notice: Subject to any disclaimer, the term of this patent is extended or adjusted under 35 U.S.C. 154(b) by 1625 days.

(21) Appl. No.: 11/654,456

(22) Filed: Jan. 17, 2007

(65) Prior Publication Data

US 2008/0172538 A1    Jul. 17, 2008

(51) Int. Cl.
  *G06F 12/00*    (2006.01)
  *G06F 13/00*    (2006.01)

(52) U.S. Cl.
  USPC ............... 711/163; 711/6; 711/152; 711/156; 711/170; 711/E12.009; 711/E12.011; 711/E12.012

(58) Field of Classification Search
  USPC ............. 711/6, 152, 156, 163, 170, E12.009, 711/E12.011, E12.012; 718/104; 707/206
  See application file for complete search history.

(56) References Cited

U.S. PATENT DOCUMENTS 5,463,778 A * 10/1995 Johnson ................. 712/229

* cited by examiner

*Primary Examiner* — Midys Rojas
(74) *Attorney, Agent, or Firm* — Brooks Kushman P.C.

(57) ABSTRACT

A method, apparatus and computer program product for providing page-protection based memory access barrier traps is presented. A value for a user-mode bit (u-bit) is computed for each extant virtual page in an address space, the u-bit indicative that an object on the virtual page is being moved by a Garbage Collector process. An instruction is executed which causes an access protection fault. The state of the u-bit for the virtual page associated with the access protection fault is consulted when the access protection fault is encountered. Additionally, the access protection fault is translated into a user-trap (utrap) and the utrap is serviced when the u-bit is set.

9 Claims, 3 Drawing Sheets

PAGE-PROTECTION BASED MEMORY ACCESS BARRIER TRAPS

BACKGROUND

One feature of Java is its garbage-collected heap, which takes care of freeing dynamically allocated memory that is no longer referenced. The Java Virtual Machine's (JVM's) heap stores all objects created by an executing Java program. Objects are created by Java's "new" operator, and memory for new objects is allocated on the heap at run time.

Garbage Collection is the process of automatically freeing objects that are no longer referenced by the program. This frees the programmer from having to keep track of when to free allocated memory, thereby preventing many potential bugs and headaches. When an object is no longer referenced by the program, the heap space it occupies must be recycled so that the space is available for subsequent new objects. The Garbage Collector must determine which objects are no longer referenced by the program and make available the heap space occupied by such unreferenced objects. In the process of freeing unreferenced objects, the Garbage Collector must run any finalizers of objects being freed. In addition to freeing unreferenced objects, a Garbage Collector may also combat heap fragmentation. Heap fragmentation occurs through the course of normal program execution. New objects are allocated, and unreferenced objects are freed such that free blocks of heap memory are left in between blocks occupied by live objects. Requests to allocate new objects may have to be filled by extending the size of the heap even though there is enough total unused space in the existing heap. This will happen if there is not enough contiguous free heap space available into which the new object will fit. On a virtual memory system, the extra paging required to service an ever-growing heap could degrade the performance of the executing program.

A potential disadvantage of a garbage-collected heap is that it adds an overhead that can affect program performance. The JVM has to keep track of which objects are being referenced by the executing program, and finalize and free unreferenced objects on the fly. This activity will likely require more CPU time than would have been required if the program explicitly freed unnecessary memory. In addition, programmers in a garbage-collected environment have less control over the scheduling of CPU time devoted to freeing objects that are no longer needed.

A Garbage Collector performs several tasks. First, the GC must detect garbage objects. Second, the GC must reclaim the heap space used by the garbage objects and make this space available to the program. Garbage detection is ordinarily accomplished by defining a set of roots and determining reachability from the roots. An object is reachable if there is some path of references from the roots by which the executing program can access the object. The roots are accessible to the program. Any objects that are reachable from the roots are considered live. Objects that are not reachable are considered garbage, because they can no longer affect the future course of program execution.

The Heap also maintains a pointer which will indicate were the next object is to be allocated with in the heap. Initially the pointer is set to the base address of the reserved address region. When a new object is created with the new operator it will make sure that the bytes required for the new object is available on heap. The heap detects this by adding the size of the new object to heap pointer. If pointer is beyond the end of the address space region, then the heap is full and a collection must be performed.

When the Garbage Collector starts running it assumes that all the objects in the heap are garbage. The Garbage Collector starts walking the roots and building a graph of all objects reachable from the roots. Once all the roots have been checked, the Garbage Collector's graph contains the set of all objects that are somehow reachable from the application's roots. Any objects that are not in the graph are not accessible by the application, and are therefore considered garbage. The Garbage Collector walks through the heap linearly, looking for contiguous blocks of garbage objects. The Garbage Collector then copies the non-garbage objects down in memory removing all of the gaps in the heap. Moving the objects in memory invalidates all pointers to the objects. Therefore the Garbage Collector modifies the application's roots so that the pointers point to the objects' new locations. In addition, if any object contains a pointer to another object, the Garbage Collector is responsible for correcting these intra-heap pointers as well. Finally the pointer is positioned just after the last non-garbage object.

Broadly, garbage collection schemes may be divided into copying and non-copying mechanisms. Non-copying collectors admit fragmentation of the heap, which, at the extreme, can mean that an allocation request may fail if no suitably sized block is free in the heap, even though the aggregate free space in the size exceeds the size of the request. Depending on the workload, fragmentation may worsen over the lifetime of the heap. Copying collectors avoid fragmentation and move objects in an attempt to maximize the size of free regions. In addition, copying collectors may allow the use of simpler and faster allocation schemes, such as "bump pointers". A bump pointer simply points to the base of a large free region in the heap. Allocation requests are serviced by simply incrementing the bump pointer.

Orthogonal to copying, collectors may use tracing or reference counting. At collection time a tracing collector follows all references, identifying all reachable objects. Non-reachable objects are garbage and the underlying memory is recycled and made available for subsequent allocation requests. A reference counting collector maintains counts of the number of references to an object. When the counter reaches zero the object may be immediately reclaimed. (In a sense, a tracing collector traces, live, reachable objects, and a reference counting collector traces potentially dead or unreachable objects). For easy of explication, the discussion below assumes copying, tracing collector, that uses bump pointer allocation.

Furthermore, we assume a concurrent copying collector. The collector is concurrent in the sense that it runs in parallel with the Java application threads (sometimes called "mutator" threads). Our concurrent copying collector is page-based in that it selects a page to evacuate and the copies all live objects residing on that page to new locations. At a later time that entire page can be reclaimed.

Garbage Collectors that move objects concurrently with application threads require the application to use a memory access barrier which detects an access to an object that is in the process of being moved by the collector and redirects the read to the new location of that object, and, if needed, waits for the copy to complete. There are several ways of employing a memory access barrier: either by adding inline instructions, use of dedicated read-barrier assist logic in the processor, or by leveraging the operating system's existing memory protection mechanisms.

SUMMARY

Conventional mechanisms such as those explained above suffer from a variety of deficiencies. One such deficiency is that when the objects in a region of memory need to be evacuated concurrently by the Garbage Collector (GC), the GC could read/write protect the pages that contain that memory region. This will prevent the application from accessing those pages without going through a trap handler, which can redirect it to the new location of the objects. However, given that the GC also runs on a thread in the same process as the application, it will also be prevented from accessing those pages. Another deficiency with conventional Garbage Collection is that in a conventional operating system, such as Solaris (available from Sun Microsystems, Inc. of Santa Clara, Calif.), using a stock page-based memory management unit (PMMU), memory access barrier traps, while they may be rare, are relatively expensive in terms of cycle time and latency and further by not scaling well when used in multiprocessor systems.

In order to overcome the above-described deficiencies with conventional operating systems and Garbage Collection techniques, the operating system kernel is modified to enable fast memory access barrier traps. While described in terms of Solaris/SPARC, the mechanism is readily applicable to other platforms.

In a particular embodiment of a method of providing page-protection based memory access barrier traps, the method includes computing a value for a user-mode bit (u-bit) for each extant virtual page in an address space, the u-bit indicative that an object on the virtual page is being moved by a Garbage Collector process. The method further includes executing an instruction which causes an access protection fault. The method further includes determining the state of the u-bit for the virtual page associated with the access protection fault when the access protection fault is encountered. Additionally, the method includes translating the access protection fault into a user-trap (utrap) and servicing the utrap when the u-bit is set.

Other embodiments include a computer readable medium having computer readable code thereon for providing page-protection based memory access barrier traps. The medium includes instructions for computing a value for a user-mode bit (u-bit) for each extant virtual page in an address space, the u-bit indicative that an object on the virtual page is being moved by a Garbage Collector process. The medium also includes instructions for executing an instruction which causes an access protection fault. The medium further includes instructions for determining the state of the u-bit for the virtual page associated with the access protection fault when the access protection fault is encountered; and instructions for when the u-bit is set, translating the access protection fault into a user-trap (utrap) and servicing the utrap.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides page-protection based memory access barrier traps as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing page-protection based memory access barrier traps as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Sun Microsystems, Inc. of Santa Clara, Calif.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
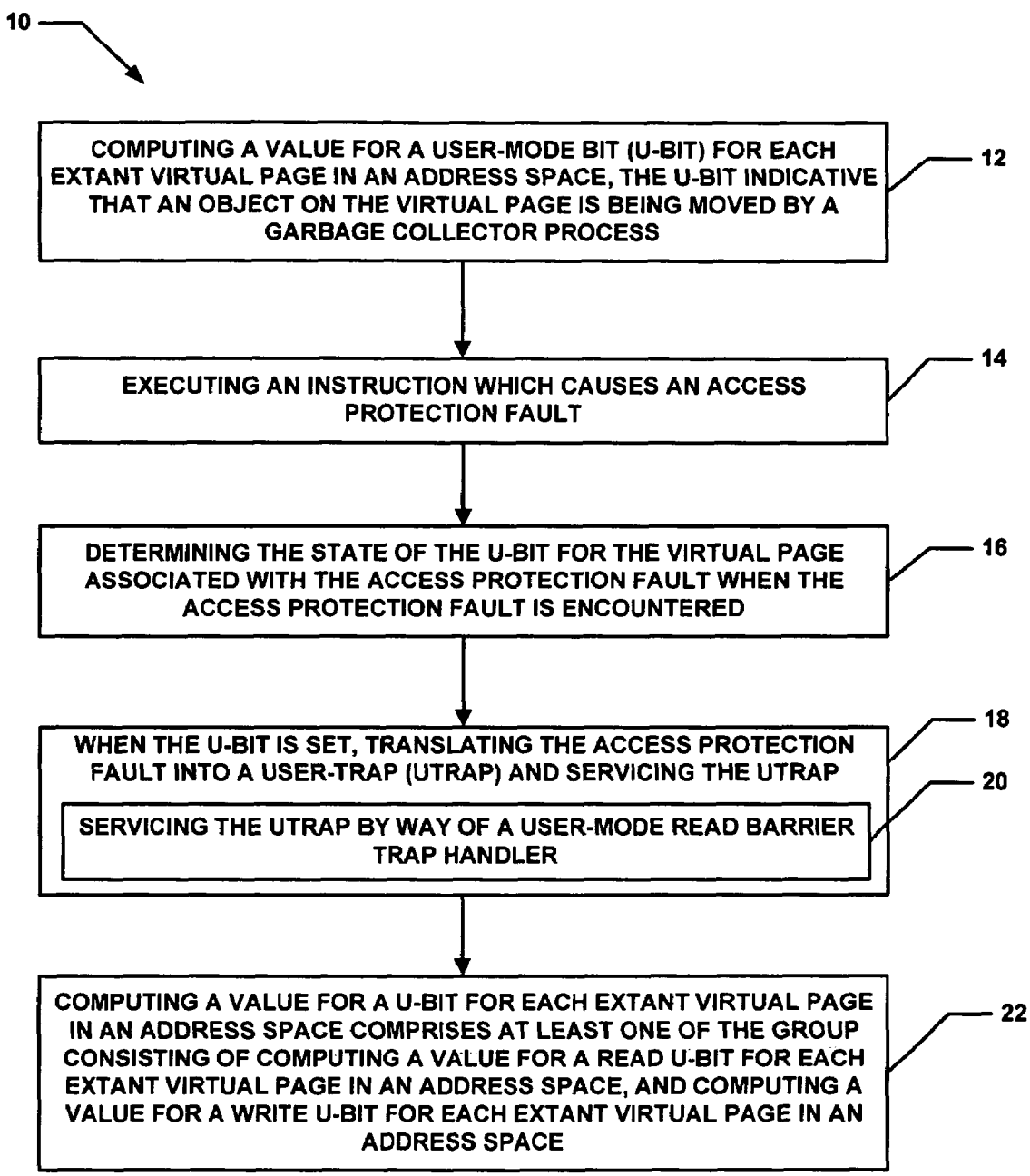
FIG. 1 depicts a flow diagram of a particular embodiment of a method of providing page-protection based memory access barrier traps in accordance with embodiments of the invention.

Normally, when an application (or mutator) thread accesses an object in the heap, the virtual page containing the object will be mapped READ+WRITE via the Solaris mprotect( ) system call. The load or store access will operate normally without incurring any traps. When the collector is operating concurrently with the application threads, however, those same heap pages may be mprotect( )ed NONE, so that mutator memory accesses will trap and generate a synchronous user-mode signal. The user-mode signal handler will typically update the object address, redirecting the access to the new location of the object. The base address of the object is normally found in a register, so the trap handler need only compute the new address (which will normally be on a READ+WRITE page), update the register, and then restart the offending load or store instruction.

A load or store to virtual page with NONE permissions generates a PMMU access protection trap. The processor aborts the instruction and diverts control to the kernel's trap handler routine. The kernel trap handler, after triaging the fault, eventually translates the trap into a signal, deflecting control to a specified user-mode handler routine. Unfortunately the triage step is rather costly, incurring considerable latency between the trap and ultimate signal delivery. This latency impairs the performance of page-protection based memory access barrier schemes. In addition to latency, the triage step will normally require that kernel-mode locks be acquired (the "address-space" lock in Solaris), impacting scalability on multiprocessor systems.

Triage is necessary as Solaris/SPARC multiplexes or utilizes a single PMMU access protection trap type for multiple purposes, such as virtual memory page swapping, mprotect( ) virtualization, etc. The kernel trap handler first determines if it can service the fault transparently, such as by loading a page from the swap file. In this case, after successfully service the trap, the trap handler simply restarts the offending instruction; no user-mode signal is posted. This is referred to as a quiet trap when the kernel services the trap in a fashion which is transparent to the user-mode code. Other instances of PMMU access protection traps, such as mutator load or store access to a NONE page, cause the kernel to dispatch control to a user-mode signal or utrap handler. Critically, transparent PMMU access protection traps are relatively rare and occur less frequently than GC memory access barrier traps.

In addition to trap triage, signal delivery itself is rather costly on most common operating systems. To circumvent the cost of traditional signal delivery Solaris provides an accelerated user-mode trap delivery system called "utraps" (user-mode traps). User code registers utrap handlers via the utrap_install( ) API. The utrap_install( ) however does not currently support intercepting PMMU access protection traps, or any other hardware trap types that that might be serviced transparently. On SPARC, for instance, a misaligned access trap is a specific trap type, distinguished by its own trap handler. Unlike PMMU access protection traps, the kernel does not use misaligned access traps for another other purpose so, unlike, PMMU access protection traps, misaligned access traps can be intercepted and serviced in user-mode via utraps.

By way of the presently described page-protection based memory access barrier trap, GC memory access barrier traps—manifested as PMMU access protection traps—that do not require normal triage can quickly be reflected to a user-mode utrap handler without the need for expensive kernel-mode trap triage in the most common cases. Conceptually, the kernel will pre-compute for each virtual page whether the triage step is necessary. This "hint" regarding whether the triage step is necessary is stored in data structures quickly accessible from the kernel PMMU trap handler. If triage is not necessary, then the only interpretation of a PMMU access trap on a page is as a GC memory access barrier trap. In this case the kernel immediately posts a fast utrap to the user-mode memory access barrier trap handler. If triage proves necessary, as would be the case when the page is not present due to swapping, the kernel employs the normal triage step. The slow-path triage operation will first service any transparent conditions, such as page-not-present faults. Finally, if the virtual protections as assigned by mprotect( ) do not match the user-mode access, the kernel will deliver a utrap, otherwise it will quietly restart the offending instruction.

In a specific embodiment a u-bit is associated with each extant virtual page in an address space. The kernel PMMU access protection fault handler will consult the u-bit: if the u-bit is set, further triage is not necessary and the kernel translates the trap into a fast utrap. If the u-bit is clear the kernel will use the normal, slower, triage mechanism (which may still generate a utrap). The kernel can be lazy in setting the u-bit, but must be conservative when clearing the u-bit. Any time the kernel adjusts the actual page permissions for a virtual page, the u-bit for that virtual page will be recomputed as well.

In another embodiment, distinct read and write u-bits (UR and UW) are implemented. In this embodiment a read u-bit and a writer u-bit are associated with each extant virtual page in an address space. The kernel PMMU access protection fault handler will consult the u-bits. For a read operation, if the read u-bit is set, further triage is not necessary and the kernel translates the trap into a fast utrap. If the read u-bit is clear the kernel will use the normal, slower, triage mechanism (which may still generate a utrap). For a write operation, if the write u-bit is set, further triage is not necessary and the kernel translates the trap into a fast utrap. If the write u-bit is clear the kernel will use the normal, slower, triage mechanism (which may still generate a utrap). Any time the kernel adjusts the actual page permissions for a virtual page, the read u-bit and write u-bit for that virtual page will be recomputed as well.

Figure 2:
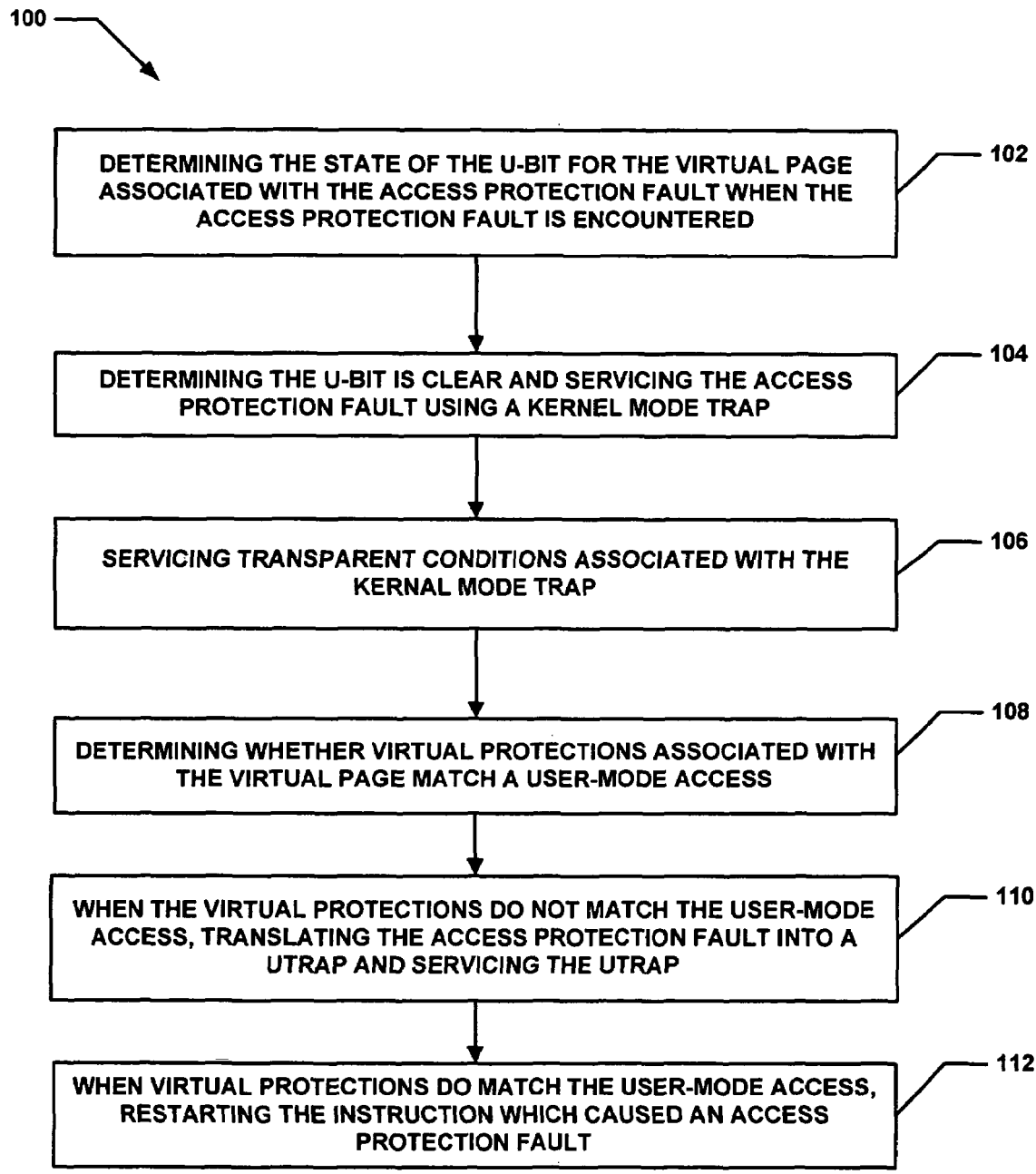
FIG. 2 depicts a flow diagram of a particular embodiment of a method of performing kernel mode traps.

Flow charts of embodiments of the presently disclosed method are depicted in FIGS. 1 and 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 1, a method 10 of providing page-protection based memory access barrier traps is shown. The method 10 begins with processing block 12 which discloses computing a value for a user-mode bit (u-bit) for each extant virtual page in an address space. As further stated in processing block 12, the u-bit is indicative that an object on the virtual page is being moved by a Garbage Collector process.

Processing block 14 recites executing an instruction which causes an access protection fault. This can occur, for example, by a load or store operation to a virtual page with NONE permissions.

Processing block 16 discloses determining the state of the u-bit for the virtual page associated with the access protection fault when the access protection fault is encountered.

Processing block 18 states when the u-bit is set, translating the access protection fault into a user-trap (utrap) and servicing the utrap. The interpretation of a PMMU access trap on a page is as a GC memory access barrier trap.

Processing block 20 discloses servicing the utrap comprises servicing the utrap by way of a user-mode memory access barrier trap handler. In this case the kernel immediately posts a fast utrap to the user-mode memory access barrier trap handler. In some scenarios it may be desirable to recompute the u-bit for a virtual page when the page permissions for the virtual page have been adjusted. The u-bit may be stored in a data structure accessible by an access protection fault handler.

Processing block 22 states wherein the computing a value for a u-bit for each extant virtual page in an address space comprises at least one of the group consisting of computing a value for a read u-bit for each extant virtual page in an address space, and computing a value for a write u-bit for each extant virtual page in an address space.

Referring now to FIG. 2, a method 100 of providing kernel mode traps is shown. The method begins with processing block 102 which recites determining the state of the u-bit for the virtual page associated with the access protection fault when the access protection fault is encountered.

Processing block 104 discloses wherein the determining the state of the u-bit further comprises determining the u-bit is clear and servicing the access protection fault using a kernel mode trap. An example of when this might occurs includes the case when the page is not present due to swapping.

Processing block 106 states wherein the servicing the access protection fault using a kernel mode trap includes servicing transparent conditions associated with the kernel mode trap. An example of a transparent conditions is a page-not-present fault. Processing block 108 recites determining whether virtual protections associated with the virtual page match a user-mode access. Processing block 110 discloses when the virtual protections do not match the user-mode access, then translating the access protection fault into a utrap and servicing the utrap. As recited in processing block 112 when virtual protections do match the user-mode access, restarting the instruction which caused an access protection fault. For example, when the virtual protections as assigned by mprotect( ) do not match the user-mode access, the kernel will deliver a utrap, otherwise it will quietly restart the offending instruction.

Figure 3:
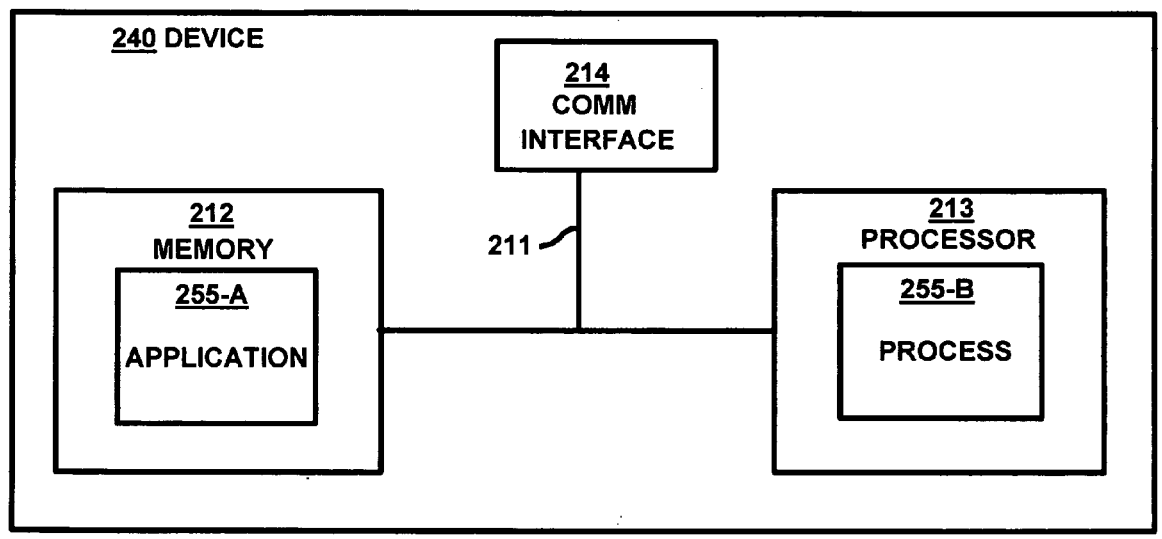
FIG. 3 illustrates an example computer system architecture for a computer system that provides page-protection based memory access barrier traps in accordance with embodiments of the invention.

FIG. 3 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing page-protection based memory access barrier traps, the method comprising:
   in response to an access protection fault for a specified virtual page, querying a cache mapping addresses of virtual pages to values of user-mode bits (u-bits) for a u-bit corresponding to the specified virtual page, each of the u-bits indicating that an object on a corresponding one of the virtual pages is being moved by a Garbage Collector process;
   in response to the query returning a zero value or not-found response, dispatching the access protection fault to a trap handler that computes a value for the u-bit corresponding to the specified virtual page, and installing the value in the cache; and
   in response to the query returning a one value, dispatching the access protection fault into a user-trap (utrap) and servicing the utrap.

2. The method of claim 1 wherein the servicing the utrap comprises servicing the utrap by way of a user-mode memory access barrier trap handler.

3. The method of claim 1 further comprising recomputing the u-bit when page permissions for the specified virtual page have been adjusted.

4. A computer readable medium having computer readable code thereon for providing page-protection based memory access barrier traps, the medium comprising:
   instructions for querying, in response to an access protection fault for a specified virtual page, a cache mapping addresses of virtual pages to values of user-mode bits (u-bits) for a u-bit corresponding to the specified virtual page, each of the u-bits indicating that an object on a corresponding one of the virtual pages is being moved by a Garbage Collector process;

instructions for dispatching, in response to the query returning a zero value or not-found response, the access protection fault to a trap handler that computes a value for the u-bit corresponding to the specified virtual page, and installing the value in the cache; and instructions for dispatching, in response to the query returning a one value, the access protection fault into a user-trap (utrap) and servicing the utrap.

5. The computer readable medium of claim 4 wherein the instructions for servicing the utrap comprise instructions for servicing the utrap by way of a user-mode memory access barrier trap handler.

6. The computer readable medium of claim 4 further comprising instructions for recomputing the u-bit when page permissions for the specified virtual page have been adjusted.

7. A computer system comprising:
a memory;
a processor;
a communications interface;
an interconnection mechanism coupling the memory, the processor and the communications interface; and
wherein the memory is encoded with an application providing page-protection based memory access barrier traps, that when performed on the processor, provide a process for processing information, the process causing the computer system to perform the operations of in response to an access protection fault for a specified virtual page, querying a cache mapping addresses of virtual pages to values of user-mode bits (u-bits) for a u-bit corresponding to the specified virtual page, each of the u-bits indicating that an object on a corresponding one of the virtual pages is being moved by a Garbage Collector process;

in response to the query returning a zero value or not-found response, dispatching the access protection fault to a trap handler that computes a value for the u-bit corresponding to the specified virtual page, and installing the value in the cache; and in response to the query returning a one value, dispatching the access protection fault into a user-trap (utrap) and servicing the utrap.

8. The computer system of claim 7 wherein the servicing the utrap comprises servicing the utrap by way of a user-mode memory access barrier trap handler.

9. The computer system of claim 7 wherein the process further causes the computer system to perform the operation of recomputing the u-bit when page permissions for the specified virtual page have been adjusted.

* * * * *